US012657870B2

(12) United States Patent
Afshar et al.

(10) Patent No.: US 12,657,870 B2
(45) Date of Patent: Jun. 16, 2026

(54) PRODUCT IMAGE CLASSIFICATION

(71) Applicant: Home Depot Product Authority, LLC, Atlanta, GA (US)

(72) Inventors: Estelle Afshar, Atlanta, GA (US); Tianlong Xu, Atlanta, GA (US); Le Yu, Atlanta, GA (US); Yuanbo Wang, Austin, TX (US); James Morgan White, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 445 days.

(21) Appl. No.: 17/591,861

(22) Filed: Feb. 3, 2022

(65) Prior Publication Data

US 2022/0254144 A1 Aug. 11, 2022

Related U.S. Application Data

(60) Provisional application No. 63/146,339, filed on Feb. 5, 2021.

(51) Int. Cl.
 *G06V 10/764* (2022.01)
 *G06Q 30/0601* (2023.01)
 *G06V 10/70* (2022.01)
 *G06V 10/74* (2022.01)
(52) U.S. Cl.
 CPC ....... *G06V 10/764* (2022.01); *G06Q 30/0643* (2013.01); *G06V 10/761* (2022.01); *G06V 10/87* (2022.01)
(58) Field of Classification Search
 CPC .... G06V 10/764; G06V 10/761; G06V 10/87; G06V 10/82; G06Q 30/0643

USPC ........................... 382/274, 224, 159; 706/20
See application file for complete search history.

(56) References Cited

U.S. PATENT DOCUMENTS

| | | | | |
|---|---|---|---|---|
| 7,349,917 | B2 * | 3/2008 | Forman ................... | G06F 16/35 |
| | | | | 706/14 |
| 9,443,320 | B1 * | 9/2016 | Gaidon ................ | G06V 10/764 |
| 9,792,530 | B1 * | 10/2017 | Wu ......................... | G06F 18/40 |
| 10,706,326 | B2 * | 7/2020 | Tsunoda ............... | G06V 10/776 |
| 10,776,626 | B1 * | 9/2020 | Lin ........................ | G06F 16/583 |
| 10,832,400 | B1 * | 11/2020 | Tang ....................... | G06T 7/001 |

(Continued)

OTHER PUBLICATIONS

Sean Bell, Yiqun Liu, Sami Alsheikh, Yina Tang, Edward Pizzi, M. Henning, Karun Singh, Omkar Parkhi, and Fedor Borisyuk. 2020. GrokNet: Unified Computer Vision Model Trunk and Embeddings for Commerce. 2608-2616. https://doi.org/10.1145/3394486.3403311.

(Continued)

*Primary Examiner* — Kathleen Y Dulaney
(74) *Attorney, Agent, or Firm* — Greenberg Traurig, LLP

(57) ABSTRACT

A method includes retrieving, by a processor in an image classification system, a plurality of product images from a memory. A first image classifier is applied to a first of the plurality of product images. The first of the plurality of product images is associated with a first category. A second image classifier is applied to a second of the plurality of product images. The second of the plurality of product images is associated with a second category. A first result of the first image classifier for the first of the plurality of product images is stored in the memory. A second result of the second image classifier for the second of the plurality of product images is stored in the memory.

15 Claims, 3 Drawing Sheets

(56) References Cited

U.S. PATENT DOCUMENTS

| 11,636,639 | B2 * | 4/2023 | Adamson, III | G06T 11/10 |
| | | | | 345/629 |
| 11,776,118 | B2 * | 10/2023 | Green | G16H 70/40 |
| | | | | 382/128 |
| 11,783,602 | B2 * | 10/2023 | Futatsugi | G06V 20/64 |
| | | | | 382/103 |
| 2005/0249401 | A1 * | 11/2005 | Bahlmann | G06V 10/7747 |
| | | | | 382/159 |
| 2011/0052063 | A1 * | 3/2011 | McAuley | G06V 20/35 |
| | | | | 382/224 |
| 2012/0016892 | A1 | 1/2012 | Wang et al. | |
| 2012/0314941 | A1 * | 12/2012 | Kannan | G06F 18/256 |
| | | | | 382/161 |
| 2014/0136549 | A1 * | 5/2014 | Surya | G06F 16/9532 |
| | | | | 707/749 |
| 2016/0260014 | A1 * | 9/2016 | Hagawa | G06V 10/82 |
| 2017/0076225 | A1 | 3/2017 | Zhang et al. | |
| 2017/0351914 | A1 * | 12/2017 | Zavalishin | G06V 10/50 |
| 2017/0372169 | A1 * | 12/2017 | Li | G06F 18/2414 |
| 2018/0012110 | A1 * | 1/2018 | Souche | G06N 3/084 |
| 2018/0239990 | A1 * | 8/2018 | Philipose | G06F 18/285 |
| 2018/0348785 | A1 * | 12/2018 | Zheng | G06V 10/82 |
| 2019/0012568 | A1 * | 1/2019 | Kumar | G06V 10/82 |
| 2019/0130214 | A1 | 5/2019 | N et al. | |
| 2020/0005087 | A1 * | 1/2020 | Sewak | G06F 3/0481 |
| 2020/0042796 | A1 * | 2/2020 | Kim | G06V 20/35 |
| 2020/0151499 | A1 * | 5/2020 | Kumar | G06V 10/94 |
| 2020/0279008 | A1 * | 9/2020 | Jain | G06F 16/954 |
| 2020/0286275 | A1 * | 9/2020 | Seo | G06T 11/60 |
| 2020/0294234 | A1 * | 9/2020 | Rance | G06F 18/22 |
| 2021/0011477 | A1 * | 1/2021 | Byun | G06V 10/764 |
| 2021/0072763 | A1 * | 3/2021 | Chen | G06V 10/774 |
| 2021/0326641 | A1 * | 10/2021 | Tsai | G06F 18/22 |
| 2022/0101112 | A1 * | 3/2022 | Brown | G06N 3/0895 |
| 2022/0108163 | A1 * | 4/2022 | Sokhandan Asl | G06V 10/774 |
| 2023/0222783 | A1 * | 7/2023 | Bowman | G06V 20/56 |
| | | | | 382/104 |
| 2023/0237802 | A1 * | 7/2023 | Falendysz | G06V 20/46 |
| | | | | 382/104 |
| 2023/0260254 | A1 * | 8/2023 | Huang | G06T 7/11 |
| | | | | 382/100 |
| 2023/0316702 | A1 * | 10/2023 | Kar | G06N 3/08 |
| | | | | 706/46 |

OTHER PUBLICATIONS

Alessandro Bergamo and Lorenzo Torresani. 2010. Exploiting weakly-labeled web images to improve object classification: a domain adaptation approach. Advances in neural information processing systems 23 (2010), 181-189.

Tianqi Chen and Carlos Guestrin. 2016. XGBoost. Proceedings of the 22nd ACM SIGKDD International Conference on Knowledge Discovery and Data Mining (Aug. 2016). https://doi.org/10.1145/2939672.2939785.

François Chollet. 2017. Xception: Deep Learning with Depthwise Separable Convolutions. arXiv:1610.02357 [cs.CV].

N. Dalal and B. Triggs. 2005. Histograms of oriented gradients for human detection. In 2005 IEEE Computer Society Conference on Computer Vision and Pattern Recognition (CVPR'05).

Wei Di, Neel Sundaresan, Robinson Piramuthu, and Anurag Bhardwaj. 2014. Is a Picture Really Worth a Thousand Words?—On the Role of Images in e-Commerce.

Ehsan Elhamifar, Guillermo Sapiro, Allen Yang, and S Shankar Sasrty. 2013. A convex optimization framework for active learning. In Proceedings of the IEEE International Conference on Computer Vision. 209-216.

Yarin Gal, Riashat Islam, and Zoubin Ghahramani. 2017. Deep bayesian active learning with image data. arXiv preprint arXiv:1703.02910 (2017).

Rohith Gandhi. 2018. Siamese Network Triplet Loss. https://towardsdatascience.com/siamese-network-triplet-loss-b4ca82c1aec8.

Kaiming He, Xiangyu Zhang, Shaoqing Ren, and Jian Sun. 2015. Deep Residual Learning for Image Recognition. arXiv:1512.03385 [cs.CV].

Houdong Hu, Yan Wang, Linjun Yang, Pavel Komlev, Li Huang, Xi Chen, Jiapei Huang, YeWu, Meenaz Merchant, and Arun Sacheti. 2018. Web-Scale Responsive Visual Search at Bing. arXiv:1802.04914 [cs.CV].

Jie Hu, Li Shen, Samuel Albanie, Gang Sun, and Enhua Wu. 2019. Squeeze-and-Excitation Networks. arXiv:1709.01507 [cs.CV].

Armand Joulin, Laurens van der Maaten, Allan Jabri, and Nicolas Vasilache. 2015. Learning Visual Features from Large Weakly Supervised Data. arXiv:1511.02251 [cs.CV].

Gregory R. Koch. 2015. Siamese Neural Networks for One-Shot Image Recognition.

Alex Krizhevsky, Ilya Sutskever, and Geoffrey E Hinton. 2012. ImageNet Classification with Deep Convolutional Neural Networks. In Advances in Neural Information Processing Systems, F. Pereira, C. J. C. Burges, L. Bottou, and K. Q. Weinberger (Eds.), vol. 25. Curran Associates, Inc., 1097-1105. https://proceedings.neurips.cc/paper/2012/file/c399862d3b9d6b76c8436e924a68c45b-Paper.pdf.

Eileen Li, Eric Kim, Andrew Zhai, Josh Beal, and Kunlong Gu. 2020. Bootstrapping Complete The Look at Pinterest. In Proceedings of the 26th ACM SIGKDD International Conference on Knowledge Discovery Data Mining (Virtual Event, CA, USA) (KDD '20). Association for Computing Machinery, New York, NY, USA, 3299-3307.

Fengzi Li, Shashi Kant, Shunichi Araki, Sumer Bangera, and Swapna Samir Shukla. 2020. Neural Networks for Fashion Image Classification and Visual Search. arXiv:2005.08170 [cs.CV].

D.G. Lowe. 2004. Lowe, D.G. Distinctive Image Features from Scale-Invariant Keypoints. International Journal of Computer Vision 60, 91-110 (2004). https://doi.org/10.1023/B:VISI.0000029664.99615.94.

Alexander Schindler, Thomas Lidy, Stephan Karner, and Matthias Hecker. 2018. Fashion and Apparel Classification using Convolutional Neural Networks. arXiv:1811.04374 [cs.CV].

Matthew Schultz and Thorsten Joachims. 2004. Learning a Distance Metric from Relative Comparisons. In Advances in Neural Information Processing Systems, S. Thrun, L. Saul, and B. Scholkopf (Eds.), vol. 16. MIT Press, 41-48. https://proceedings.neurips.cc/paper/2003/file/d3b1fb02964aa64e257f9f26a31f72cf-Paper.pdf.

Ozan Sener and Silvio Savarese. 2017. Active learning for convolutional neural networks: A core-set approach. arXiv preprint arXiv:1708.00489 (2017).

Devashish Shankar, Sujay Narumanchi, HA Ananya, Pramod Kompalli, and Krishnendu Chaudhury. 2017. Deep learning based large scale visual recommendation and search for e-commerce. arXiv preprint arXiv:1703.02344 (2017).

Raymond Shiau, Hao-Yu Wu, Eric Kim, Yue Du, Anqi Guo, Zhiyuan Zhang, Eileen Li, Kunlong Gu, Charles Rosenberg, and Andrew Zhai. 2020. Shop The Look: Building a Large Scale Visual Shopping System at Pinterest. 3203-3212. https://doi.org/10.1145/3394486.3403372.

Karen Simonyan and Andrew Zisserman. 2015. Very Deep Convolutional Networks for Large-Scale Image Recognition. arXiv:1409.1556 [cs.CV].

Christian Szegedy, Sergey Ioffe, Vincent Vanhoucke, and Alex Alemi. 2016. Inception-v4, Inception-ResNet and the Impact of Residual Connections on Learning. arXiv:1602.07261 [cs.CV].

Christian Szegedy, Wei Liu, Yangqing Jia, Pierre Sermanet, Scott Reed, Dragomir Anguelov, Dumitru Erhan, Vincent Vanhoucke, and Andrew Rabinovich. 2014. Going Deeper with Convolutions. arXiv:1409.4842 [cs.CV].

Yina Tang, Fedor Borisyuk, Siddarth Malreddy, Yixuan Li, Yiqun Liu, and Sergey Kirshner. 2019. MSURU: Large Scale E-commerce Image Classification with Weakly Supervised Search Data. In Proceedings of the 25th ACM SIGKDD International Conference on Knowledge Discovery & Data Mining. 2518-2526.

Jiang Wang, Yang Song, Thomas Leung, Chuck Rosenberg, Jinbin Wang, James Philbin, Bo Chen, and Ying Wu. 2014. Learning Fine-grained Image Similarity with Deep Ranking. arXiv:1404.4661 [cs.CV].

(56)        References Cited

OTHER PUBLICATIONS

Kai Wei, Yuzong Liu, Katrin Kirchhoff, Chris Bartels, and Jeff Bilmes. 2014. Submodular subset selection for large-scale speech training data. In 2014 IEEE International Conference on Acoustics, Speech and Signal Processing (ICASSP). IEEE, 3311-3315.

Wikipedia.org. 2020. XGBoost. https://en.wikipedia.org/wiki/XGBoost.

Stephen Zakrewsky, Kamelia Aryafar, and Ali Shokoufandeh. 2016. Item Popularity Prediction in E-commerce Using Image Quality Feature Vectors.8 arXiv:1605.03663 [cs.CV].

J. Zhang, S. Lazebnik, and C. Schmid. 2007. Local features and kernels for classification of texture and object categories: a comprehensive study. International Journal of Computer Vision 73 (2007), 2007.

Yanhao Zhang, Pan Pan, Yun Zheng, Kang Zhao, Yingya Zhang, Xiaofeng Ren, and Rong Jin. 2018. Visual Search at Alibaba.

Fedor Zhdanov. 2019. Diverse mini-batch Active Learning. arXiv preprint arXiv:1901.05954 (2019).

Yun Zhu, Sayyed M. Zahiri, Jiaqi Wang, Han-Yu Chen, and Faizan Javed. 2020. Active Learning for Product Type Ontology Enhancement in E-commerce. arXiv:2009.09143 [cs.LG].

Zhen Zuo, L. Wang, Michinari Momma, W. Wang, Yikai Ni, Jianfeng Lin, and Y. Sun. 2020. A flexible large-scale similar product identification system in e-commerce.

ISA/US, ISR/WO issued in PCT/US22/15173, dated Apr. 25, 2022, 9 pgs.

* cited by examiner

10 ⟶

50

RETRIEVE IMAGE DATA FOR A PLURALITY OF
PRODUCT IMAGES
52

APPLY A RESPECTIVE IMAGE CLASSIFIER OF A
PLURALITY OF IMAGE CLASSIFIERS
54

STORE THE RESULTS FROM THE IMAGE
CLASSIFICATION
56

PRODUCT IMAGE CLASSIFICATION

CROSS-REFERENCE TO RELATED APPLICATIONS

This application claims the benefit of U.S. Provisional Application No. 63/146,339 filed on Feb. 5, 2021, the entirety of which is incorporated by reference herein.

FIELD

This disclosure is directed generally to image classification. More specifically, this disclosure is directed to image type classification of product images for display via a user interface.

BACKGROUND

Retail websites can include a plurality of product images and text related to a product available for purchase via the retail website. Retail websites can make a large number of products available for purchase. Each of the products can include multiple product images depicting different views of the products available for purchase. As a result, the retailer may have thousands or millions of images to manage in order to provide a user with the most effective product views.

SUMMARY

In some embodiments, a method includes retrieving, by a processor in an image classification system, a plurality of product images from a memory. A first image classifier is applied to a first of the plurality of product images. The first of the plurality of product images is associated with a first category. A second image classifier is applied to a second of the plurality of product images. The second of the plurality of product images is associated with a second category. A first result of the first image classifier for the first of the plurality of product images is stored in the memory. A second result of the second image classifier for the second of the plurality of product images is stored in the memory.

In some embodiments, the first result may be a content label or a view label. In some embodiments, the first result can include a content label and a view label.

In some embodiments, the first image classifier can include a plurality of image classifiers. In some embodiments, a first of the plurality of image classifiers can predict a content label for the first of the plurality of product images. In some embodiments, a second of the plurality of image classifiers can predict a view label for the first of the plurality of product images. In some embodiments, one or more additional image classifiers can be included to predict other features of the first of the plurality of product images such as, but not limited to, color tone or the like. In some embodiments, a first of the plurality of image classifiers can calculate features that will be provided to a second of the plurality of image classifiers as input to predict the labels (content and view, or the like) for the first of the plurality of product images. In some embodiments, the first of the plurality of image classifiers can be a Siamese neural network. In some embodiments, the second of the plurality of image classifiers can implement machine learning such as, but not limited to, XGBoost.

In some embodiments, the second result may be a content label or a view label. In some embodiments, the second result can include a content label and a view label.

In some embodiments, the second image classifier can include a plurality of image classifiers. In some embodiments, a first of the plurality of image classifiers can predict a content label for the second of the plurality of product images. In some embodiments, a second of the plurality of image classifiers can predict a view label for the second of the plurality of product images. In some embodiments, one or more additional image classifiers can be included to predict other features of the second of the plurality of product images such as, but not limited to, color tone or the like. In some embodiments, a first of the plurality of image classifiers can calculate features that will be provided to a second of the plurality of image classifiers as input to predict the labels (content and view, or the like) for the second of the plurality of product images. In some embodiments, the first of the plurality of image classifiers can be a Siamese neural network. In some embodiments, the second of the plurality of image classifiers can implement machine learning such as, but not limited to, XGBoost.

In some embodiments, an image classification system includes a processor and a memory. In some embodiments, the processor is configured to retrieve a plurality of product images from the memory. The processor applies a first image classifier to a first of the plurality of product images. The first of the plurality of product images is associated with a first category. The processor applies a second image classifier is applied to a second of the plurality of product images. The second of the plurality of product images is associated with a second category. The processor stores a first result of the first image classifier for the first of the plurality of product images in the memory. The processor stores a second result of the second image classifier for the second of the plurality of product images in the memory.

In some embodiments, a system includes a server; and an image classification system. The image classification system includes a processor and a memory. In some embodiments, the processor is configured to retrieve a plurality of product images from the memory. The processor applies a first image classifier to a first of the plurality of product images. The first of the plurality of product images is associated with a first category. The processor applies a second image classifier is applied to a second of the plurality of product images. The second of the plurality of product images is associated with a second category. The processor stores a first result of the first image classifier for the first of the plurality of product images in the memory. The processor stores a second result of the second image classifier for the second of the plurality of product images in the memory.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Figure 1:
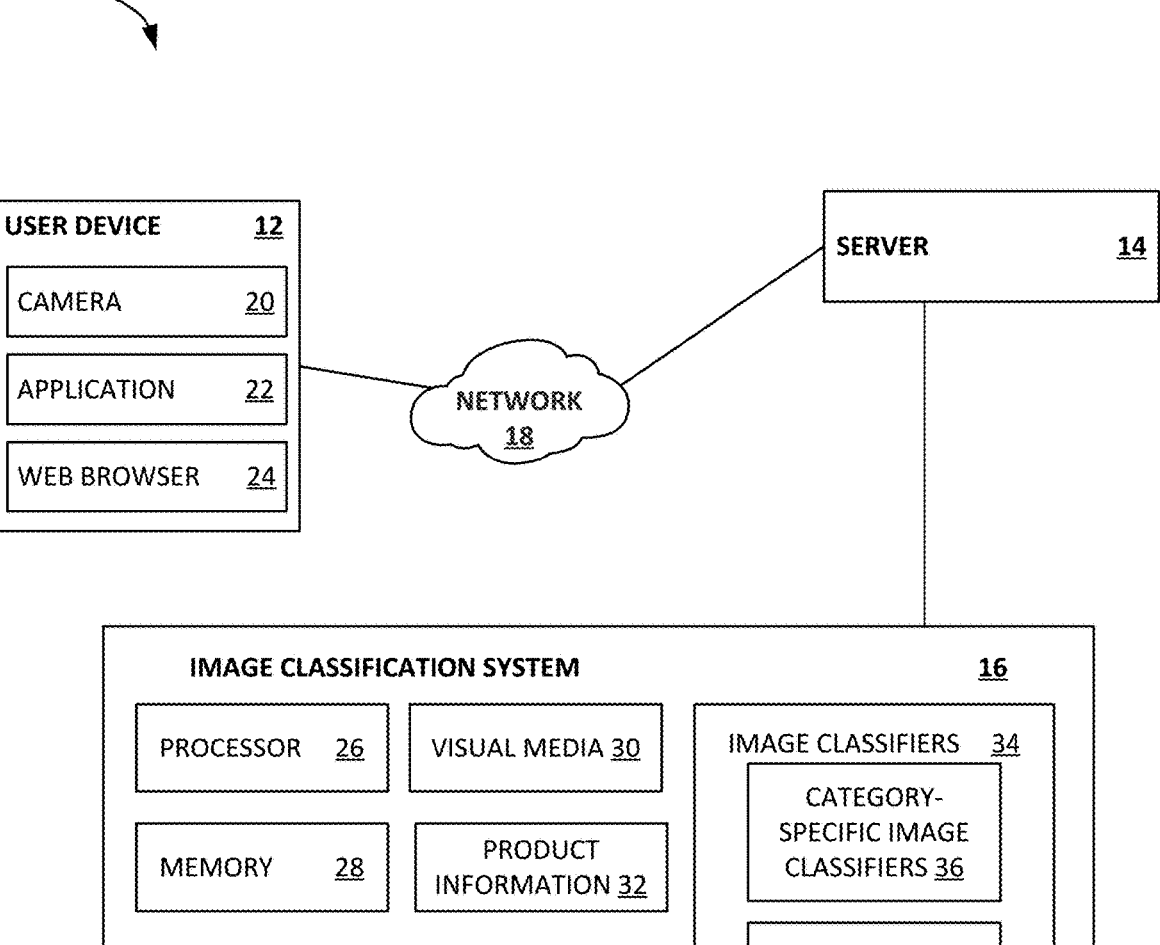
FIG. 1 is a diagrammatic view of an example system for operating an improved image classification system, according to some embodiments.

In online retail (e.g., retail websites), products can be presented to a user in a combination including visual media (e.g., one or more product images, videos, or any combination thereof) and text descriptions of the products. The visual media (i.e., the one or more product images, videos, or any combination thereof) is increasingly important in presenting the products to potential customers. A retailer can have hundreds, thousands, or millions of products available for purchase. Each product available for purchase can include one or more product images and one or more videos. As a result, the retailer may store millions of product images, videos, or any combination thereof. Retailers may display several product images and/or videos of a product to provide a customer a more comprehensive understanding of the product through a website or an application on, for example, a mobile device. It is important for the retailer to be able to identify and select the most appropriate product images for the customer to increase accuracy of visual search results and to increase overall customer engagement through the website or application.

Manual selection of the most relevant product image to enable a specific customer experience (e.g. inspiration, advertisement, comparison, etc.) is typically not possible given the number of products and product images. Even when a product is known, product images can be described using different aspects of the image, such as, but not limited to, the image content (room scene, white background, line art, etc.), the product view (front-facing, angled views, etc.), the annotations, etc. These descriptors of the product images are useful in selecting the best product image for an application.

Embodiments of this disclosure include an image type ontology to define visual concepts and organize their relationships. Based on the image type ontology, a series of image classifiers can be trained to predict the labels (e.g., content, view, etc.) that define an image type within the image type ontology. The image classifiers can include a combination of computer vision approaches (e.g., feature engineering) and deep learning approaches (e.g., fine-tuned convolutional neural networks with Siamese network triplet loss). In some embodiments, the prediction accuracies can be improved by applying an active learning approach to select highly informative training data.

In some embodiments, verification test results indicate that accuracies of the systems and methods described herein can range from 84% to 98%.

In some embodiments, the classification process can be automated and executed on a periodic basis (e.g., weekly or the like). In some embodiments, the classification process can label millions of images, in parallel, in a matter of hours.

Examples within this description may generally be focused on product images (e.g., for products such as home improvement products or the like). It is to be appreciated that the systems and methods described herein can be applied in other applications in which a number of images are being utilized, with a selection of a subset of those images being displayed to a user. Examples include, but are not limited to, products other than home improvement products, travel websites displaying various views of rooms or properties for rent, or the like.

FIG. 1 is a diagrammatic view of an example system 10 for operating an improved image classification system, according to some embodiments. In some embodiments, the system 10 can be used to identify a best image for a selected application. In some embodiments, the selected application can include, but is not limited to, creation of line art imagery, recommendations of visually similar products, execution of a visual search query, any combination thereof, or the like.

The system 10 can include a user computing device 12, a server 14, and an image classification system 16. The user computing device 12, the server 14, and the image classification system 16 can be electronically communicable via a network 18. It is to be appreciated that the illustration is an example and that the system 10 can vary in architecture. Generally, the system 10 will include more than one of the user computing device 12 in communication with the server 14 via the network 18.

The user computing device 12 can include a camera 20. In some embodiments, the user computing device 12 can include an application 22 and a web browser 24. In some embodiments, the application 22 or the web browser 24 can be used to submit a captured image from the camera 20 to the server 14 for utilization in, for example, conducting a visual search to identify images within a product image library that are visually similar (e.g., a visual search). In some embodiments, the application 22 or the web browser 24 can include an interface for displaying one or more product images to a user, such as product images returned from the server 14 to the user computing device 12 in response to a search query.

In some embodiments, the camera 20 may be capable of capturing photographs, video, or combinations thereof. In some embodiments, the captured image can be a photograph or a video of a product a user would like to use as an input to a search query (e.g., a visual search). In some embodiments, the camera 20 can capture an image without the user performing an action (e.g., without pressing a button) to cause the image to be captured. As used herein, a "captured image" is an image that has been captured by the user computing device 12. In some embodiments, when the user captures a video, a frame of the video may be used as a single image to represent the "captured image."

In some embodiments, the camera 20 can be physically separate from the user computing device 12, but electronically communicable with the user computing device 12.

Examples of the user computing device 12 include, but are not limited to, a personal computer (PC), a laptop computer, a mobile device (e.g., a smartphone, a personal digital assistant (PDA), a tablet-style device, etc.), a wearable mobile device (e.g., a smart watch, a head wearable device, etc.), or the like. The user computing device 12 generally includes a display and an input. Examples of the display for the user computing device 12 include, but are not limited to, a monitor connected to a PC, a laptop screen, a mobile device screen, a tablet screen, a wearable mobile device screen, or the like. Examples of the inputs for the user computing device 12 include, but are not limited to, a keyboard, a mouse, a trackball, a button, a voice command, a proximity sensor, a touch sensor, an ocular sensing device for determining an input based on eye movements (e.g., scrolling based on an eye movement), suitable combinations thereof, or the like. The user computing device 12 can include aspects that are the same as, or similar to, FIG. 3 below.

The server 14 may be in electronic communication with the user computing device 12 via the network 18. In some embodiments, the server 14 can be a web server that is capable of providing a website for access by the user computing device 12. For example, in some embodiments, the server 14 may serve an e-commerce website. In some embodiments, the website served by the server 14 may include a search interface for receiving search queries, such as visual search queries (e.g., based on an image captured by a user). In some embodiments, the server 14 may be communicable with the image classification system 16 to identify one or more product images similar to the captured image from the user.

The server 14 can be electronically communicable with the image classification system 16.

The image classification system 16 can be configured to predict labels that define product images that can be used (e.g., by the server 14 in rendering a website for a user) to provide a best product image to a user, depending upon how the product image is being used for the user.

The image classification system 16 can include a processor 26 and a non-transitory, computer-readable memory 28. The memory 28 can store instructions that, when executed by the processor 26, cause the image classification system 16 to perform one or more of the steps, processes, or methods of this disclosure.

The image classification system 16 can include visual media 30. In some embodiments, the visual media 30 can include a plurality of product images, a plurality of videos, or any combination thereof. In some embodiments, the visual media 30 includes product images, product videos, or any combination thereof. In some embodiments, the image classification system 16 can include product information 32. The product information 32 can include product types for respective product images.

The image classification system 16 can be configured to predict one or more labels of the product images in the visual media 30. The image classification system 16 can use a plurality of image classifiers 34 to predict the labels of the product images in the visual media 30. In some embodiments, the plurality of image classifiers 34 can iteratively predict a content label or a view label for the product images in the visual media 30. In some embodiments, the plurality of image classifiers 34 can predict a content label and a view label for the product images in the visual media 30.

In some embodiments, each of the product images and the videos in the visual media 30 can be labeled based on a content type, a view type, or any combination thereof. The predicted labels of the visual media 30 can be stored for each of the product images and the product videos to describe the content within the product image and the type of view within the product image. The predicted labels of the visual media 30 can generally define concepts that are used to characterize a product image and organize relationships between product images. The predicted labels are important to selecting a best image for a particular customer experience or for inputting an appropriate product image into a search or other image processing algorithm.

In some embodiments, the content type can include, but is not limited to, closeup, swatch/sample, set, prop, packaged, silo, lifestyle, annotation, or any combination thereof. In some embodiments, a content type can include sub-types as well. For example, in some embodiments, the closeup type can include sub-types closeup-white background and closeup-non-white background. In some embodiments, the swatch/sample type can include sub-types of can, smear, brand, and blob. In some embodiments, the set content type can include set-parts, set-full (non-identical parts), and set-full (identical parts). In some embodiments, the silo content type can include sub-types white background and non-white background. In some embodiments, the lifestyle content type can include sub-types lifestyle-product, lifestyle-limited scene, and lifestyle-full scene. In some embodiments, the annotation content type can include sub-types infographic and dimension. In some embodiments, a content type may not have any sub-types.

In some embodiments, the view type can include, but is not limited to, distance, curl, vertically angled, horizontally angled, orientation, or any combination thereof. In some embodiments, a view type can include sub-types as well. For example, in some embodiments, the distance type can include sub-types near and far. In some embodiments, the curl type can include sub-types rolled, stacked, and folded. In some embodiments, the vertically aligned type can include sub-types 90° (top), 270° (bottom), 45°/135°, and other. In some embodiments, the horizontally aligned content type can include sub-types 0° (front), angled-right, angled-left, 90° (left), 270° (right), and 180° (back). In some embodiments, the orientation content type can include sub-types erect and flat.

The image classification system 16 can be configured to receive a plurality of product images as an input and to utilize the plurality of image classifiers 34 to predict labels for the plurality of product images within a content type, a view type, or any combination thereof. The image classification system 16 can be configured to utilize a product type that is associated with the product image to apply selected classifiers from the plurality of image classifiers 34 that is specifically trained for usage with that particular product type. For example, a product of type "appliance" can be configured to utilize one or more of the plurality of image classifiers 34 that is configured to identify features specific to product images of appliances. As such, the plurality of image classifiers 34 can be utilized in a manner that a category-specific image classifier is applied to certain product types. In some embodiments, a generic (e.g., not product type specific) image classifier from the plurality of image classifiers 34 can be used for product types that do not include a specifically trained image classifier of the plurality of image classifiers 34.

In some embodiments, the image classification system 16 can be configured to categorize all product images within the visual media 30 on a periodic basis such as, but not limited to, daily, weekly, monthly, or the like. In some embodiments, running weekly may be preferable as the visual media 30 may not change much on a daily basis. In some embodiments, the image classification system 16 can be configured to predict labels for all product images during an initial execution, and then categorize the delta on a periodic basis. That is, after an initial execution, the image classification system 16 can predict labels for the product images which are newly identified in a subsequent execution. If changes are made to the plurality of image classifiers 34, then the image classification system 16 can again execute on all product images within the visual media 30.

In some embodiments, the plurality of image classifiers 34 can include category-specific image classifiers 36 (e.g., specific to a product type) or generic image classifiers 38 (e.g., not specific to a product type).

In some embodiments, category-specific image classifiers 36 can be trained using relatively smaller, human-labeled datasets sampled from categories of products that share similar shapes and can be designed to obtain higher accuracies for more specific views. Suitable product categories for the category-specific image classifiers 36 include, but are not limited to, chairs (e.g., dining chairs, office chairs, patio chairs, or the like). Category-specific image classifiers 36 can be trained using a data set that includes, for example, 150 to 250 instances per category.

In some embodiments, the generic image classifiers 38 can be trained on a relatively larger human-labeled dataset (e.g., 40,000 to 60,000 images) that are sample images across all product categories (to be robust for variation of product type).

In some embodiments, the plurality of image classifiers 34 are convolutional neural networks (CNNs). In some embodiments, the plurality of image classifiers 34 can be pretrained models. In some embodiments, active learning can be used to start with a small amount of cleaned data and iteratively train the CNN, at each iteration, selecting one or more samples, labeling the samples by human annotators, and adding the annotated samples back into the original training data at the next iteration.

In some embodiments, the plurality of image classifiers 34 can include a first image classifier to predict a content label for the product images. In some embodiments, a second image classifier can predict a view label for the product images. In some embodiments, one or more additional image classifiers can be included to predict other features of the product images such as, but not limited to, color tone or the like. In some embodiments, the first image classifier can calculate features that will be provided to the second image classifier as input to predict the labels (content and view, or the like) for the product images. In some embodiments, the first image classifier can be a Siamese neural network. In some embodiments, the second image classifier can implement machine learning such as, but not limited to, XGBoost. It is to be appreciated that the usage of the plurality of image classifiers 34 can be iterative and thus can include more than two image classifiers, each specifically configured to predict a different feature of the product images.

It is to be appreciated that various roles of the server 14 and the image classification system 16 can be distributed among the devices in the system 10. In some embodiments, the image classification system can be on board the server 14.

In some embodiments, the network 18 can be representative of the Internet. In some embodiments, the network 18 can include a local area network (LAN), a wide area network (WAN), a wireless network, a cellular data network, combinations thereof, or the like.

Figure 2:
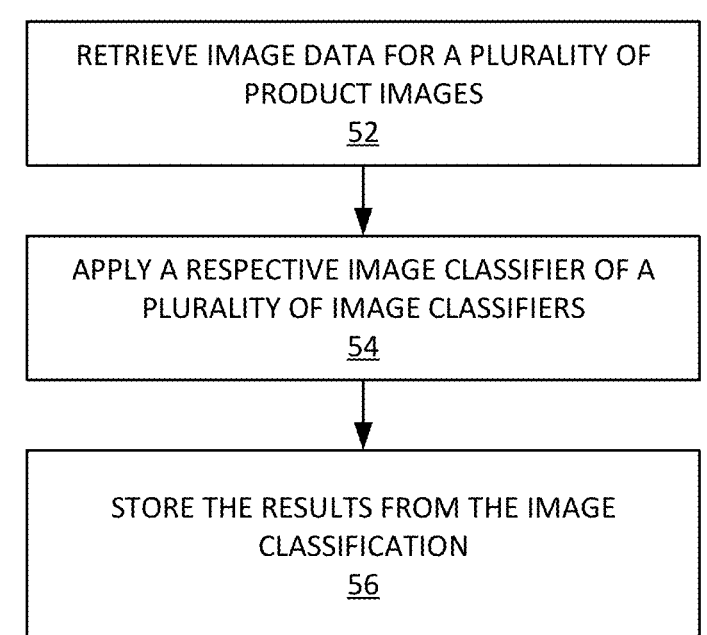
FIG. 2 is a flowchart illustrating an example method for predicting labels for a plurality of product images, according to some embodiments.

FIG. 2 is a flowchart illustrating an example method 50 for predicting labels for a plurality of product images, according to some embodiments. The method 50 can utilize the image classification system 16 (FIG. 1). In some embodiments, the method 50 can be performed on a periodic basis such as, but not limited to, weekly.

At block 52, the image classification system 16 can retrieve image data from the visual media 30. In some embodiments, the image data can include a product type associated with a respective product image. In some embodiments, the image data can include all product images within the visual media 30. In some embodiments, the image data can include all product images newly added since the last time the method 50 was performed. In some embodiments, if no product images were added since the last time the method 50 was performed, the method 50 may be stopped and then run again at the next period (e.g., the following week).

At block 54, the image classification system 16 applies a respective image classifier (e.g., of the plurality of image classifiers 34 (FIG. 1) to the image data. For example, the image classification system 16 may apply a different one of the plurality of image classifiers 34 to different product images depending upon a product type associated with the product image. For example, a first image classifier may be applied to a first image in a first category and a second image classifier to a second image in a second category. In some embodiments, the image classification system 16 can apply a plurality of image classifiers to a product image. For example, the first image classifier can include a plurality of image classifiers. Accordingly, the plurality of image classifiers can be applied to the first image in the first category. In some embodiments, the second image classifier can similarly include a plurality of image classifiers. In some embodiments, the second image classifier can be applied to a third image in a third category that is different from the second category. In such embodiments, the first image classifier may be a category-specific classifier whereas the second image classifier is a generic image classifier.

At block 56, the image classification system 16 stores the results from the image classification at block 54. In some embodiments, the results can include a plurality of labels defining a content type and a view type of the plurality of product images.

In some embodiments, the image classification system 16 can return an output to a user via the server 14 and the user device 12. Examples of returning an output are described below.

In some embodiments, the stored results from block 56 can be used to create line art imagery, according to some embodiments. Line art imagery includes a product image having dimensions overlaid on the product image. In such embodiments, a product image can be retrieved from the visual media 30 for a particular product. For example, the product can be an area rug. The retrieval may be limited to product images for the particular area rug having a given content type and view type (e.g., labels). As a result, using the stored results of the image classification by the image classification system 16, one or more product images for the area rug that are silo-front images can be selected. These image content types and view types may be relatively simpler for overlaying dimensions than other content types and view types. In some embodiments, the overlaid image can be returned as an output to the user for display by the user device 12.

In some embodiments, the stored results can be used to make a recommendation to a user of visually similar products to the product currently being viewed by a user. In such embodiments, a pairwise visual similarity score (e.g., a cosine similarity score) can be computed for the product image as received relative to other product images. To improve the likelihood of identifying visually similar products, the images selected for computing the pairwise visual similarity score can be based on a content type and view type of the product image being viewed by the user and the content type and view type of the images of other products so that similar content types and views are being used in computing the pairwise visual similarity score. Product images having a highest visual similarity score can be presented for display to the user. In some embodiments, product images having the top 5 to 10 visual similarity scores can be used for display to the user. In some embodiments, product images of the visually similar products can be returned as an output to the user for display by the user device 12.

In some embodiments, the stored results can be used to perform a query based on an image from a user. In such embodiments, the server 14 can receive an image from a user device (e.g., an image of a product captured using a camera on a mobile device). An object detection model can be applied to locate and predict labels for a product of interest within the captured image. The captured image can be cropped to focus on the product of interest within the captured image. Candidate images can be identified based on the predicted labels. Visual similarity scores (e.g., a cosine similarity score) can be computed for the captured image relative to candidate images to select a highest visual similarity score for returning to the user computing device 12 for display. In some embodiments, product images of the search results can be returned as an output to the user for display on the user device 12.

Similar to the visual search, in some embodiments, the stored results can be used to identify complementary products.

Figure 3:
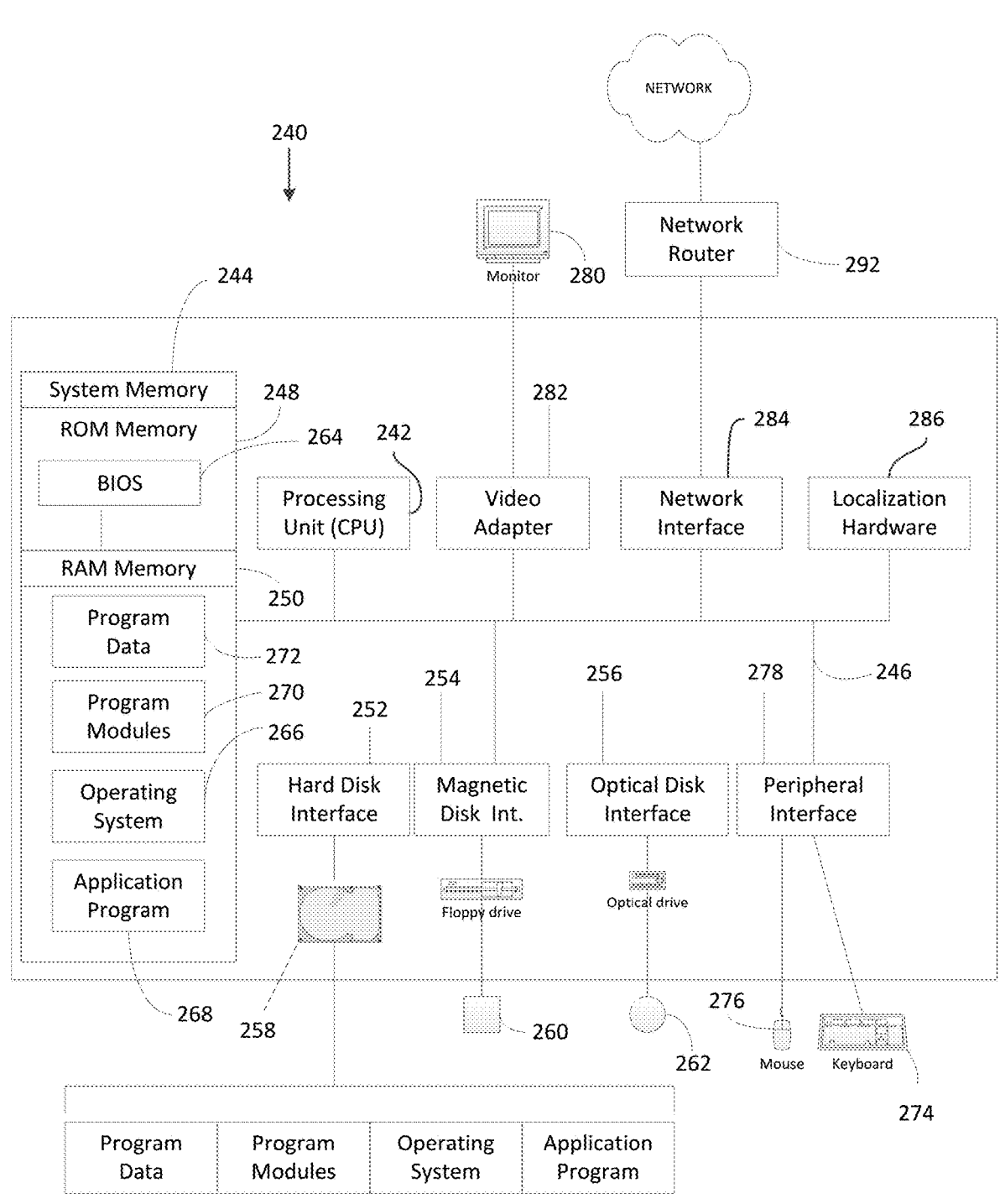
FIG. 3 is a diagrammatic view of an example user computing environment, according to some embodiments.

FIG. 3 is a diagrammatic view of an illustrative computing system that includes a general-purpose computing system environment 240, such as a desktop computer, laptop, smartphone, tablet, or any other such device having the ability to execute instructions, such as those stored within a non-transient, computer-readable medium. Furthermore, while described and illustrated in the context of a single computing system 240, those skilled in the art will also appreciate that the various tasks described hereinafter may be practiced in a distributed environment having multiple computing systems 240 linked via a local or wide-area network in which the executable instructions may be associated with and/or executed by one or more of multiple computing systems 240.

In its most basic configuration, computing system environment 240 typically includes at least one processing unit 242 and at least one memory 244, which may be linked via a bus 246. Depending on the exact configuration and type of computing system environment, memory 244 may be volatile (such as RAM 250), non-volatile (such as ROM 248, flash memory, etc.) or some combination of the two. Computing system environment 240 may have additional features and/or functionality. For example, computing system environment 240 may also include additional storage (removable and/or non-removable) including, but not limited to, magnetic or optical disks, tape drives and/or flash drives. Such additional memory devices may be made accessible to the computing system environment 240 by means of, for example, a hard disk drive interface 252, a magnetic disk drive interface 254, and/or an optical disk drive interface 256. As will be understood, these devices, which would be linked to the system bus 246, respectively, allow for reading from and writing to a hard drive 258, reading from or writing to a removable magnetic disk 260, and/or for reading from or writing to a removable optical disk 262, such as a CD/DVD ROM or other optical media. The drive interfaces and their associated computer-readable media allow for the nonvolatile storage of computer readable instructions, data structures, program modules and other data for the computing system environment 240. Those skilled in the art will further appreciate that other types of computer readable media that can store data may be used for this same purpose. Examples of such media devices include, but are not limited to, magnetic cassettes, flash memory cards, digital video-disks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 240.

Several program modules may be stored in one or more of the memory/media devices. For example, a basic input/output system (BIOS) 264, containing the basic routines that help to transfer information between elements within the computing system environment 240, such as during start-up, may be stored in ROM 248. Similarly, RAM 250, hard drive 258, and/or peripheral memory devices may be used to store computer executable instructions comprising an operating system 266, one or more applications programs 268 (such as the search engine or search result ranking system disclosed herein), other program modules 270, and/or program data 272. Still further, computer-executable instructions may be downloaded to the computing environment 240 as needed, for example, via a network connection.

An end-user may enter commands and information into the computing system environment 240 through input devices such as a keyboard 274 and/or a pointing device 276. While not illustrated, other input devices may include a microphone, a joystick, a game pad, a scanner, etc. These and other input devices would typically be connected to the processing unit 242 by means of a peripheral interface 278 which, in turn, would be coupled to bus 246. Input devices may be directly or indirectly connected to processor 242 via interfaces such as, for example, a parallel port, game port, firewire, or a universal serial bus (USB). To view information from the computing system environment 240, a monitor 280 or other type of display device may also be connected to bus 246 via an interface, such as via video adapter 282. In addition to the monitor 280, the computing system environment 240 may also include other peripheral output devices, not shown, such as speakers and printers.

The computing system environment 240 may also utilize logical connections to one or more computing system environments. Communications between the computing system environment 240 and the remote computing system environment may be exchanged via a further processing device, such a network router 292, that is responsible for network routing. Communications with the network router 292 may be performed via a network interface component 284. Thus, within such a networked environment, e.g., the Internet, World Wide Web, LAN, or other like type of wired or wireless network, it will be appreciated that program modules depicted relative to the computing system environment 240, or portions thereof, may be stored in the memory storage device(s) of the computing system environment 240.

The computing system environment 240 may also include localization hardware 286 for determining a location of the computing system environment 240. In embodiments, the localization hardware 286 may include, for example only, a GPS antenna, an RFID chip or reader, a Wi-Fi antenna, or other computing hardware that may be used to capture or transmit signals that may be used to determine the location of the computing system environment 240.

The computing environment 240, or portions thereof, may include one or more of the user computing device 12 and the image classification system 16 of FIG. 1, in embodiments.

The systems and methods described herein can advantageously ensure that B2B interactions include flexible and easy to manage security policies that are customizable by the businesses and the users accessing the computer systems of another business (e.g., a retail seller).

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method, comprising:

retrieving, by a processor in an image classification system, a plurality of product images from a memory;

determining a category of a plurality of categories for a product in each of the plurality of product images based on a product information associated with respective product images;

applying one or more image classifiers of a plurality of image classifiers to each of the plurality of product images based on the respective determined category to predict labels for each of the plurality of product images, the applying comprising:

providing a first label prediction based on applying a first image classifier to features of a first product image of the plurality of product images, wherein the first image classifier is trained to identify features specific to the determined category of the first product image; and providing a second label prediction based on applying a second image classifier to features of a second product image of the plurality of product images, wherein the second product image is from a determined category that does not include specifically trained image classifiers of the plurality of image classifiers, and the second image classifier is trained to identify features in product images that are from categories that do not include the specifically trained image classifiers;

storing the labels including the first label prediction of the first image classifier for the first product image and the second label prediction of the second image classifier for the second product image; and selecting, in response to a captured image from a user computing device, one of the plurality of product images as a recommendation based on the predicted labels for each of the plurality of product images and outputting the selected one of the plurality of product images for display on the user computing device, wherein the plurality of image classifiers are configured to predict at least one of a content label or a view label for the product in each of the plurality of product images based on the determined category, wherein the first image classifier is at least one of a plurality of category-specific image classifiers and the second image classifier is one of a plurality of a generic image classifiers for categories not associated with a corresponding one of the category-specific image classifiers.

2. The method of claim 1, wherein the first label prediction by the first image classifier is based on the first product image being in a first category of the determined categories and the second label prediction by the second image classifier is based on the second product image being in a second category not associated with one of the determined categories.

3. The method of claim 2, further comprising:

providing a third label prediction based on applying the second image classifier to features of a third product image of the plurality of product images, wherein the third product image of the plurality of product images is associated with a third category different from the second category; and storing the third label prediction of the second image classifier for the third product image of the plurality of product images.

4. The method of claim 2, wherein the first image classifier is a category-specific image classifier associated with the first category.

5. The method of claim 1, wherein applying the first image classifier to the first product image of the plurality of product images further comprising:

providing a fourth label prediction based on applying a fourth image classifier to the first product image of the plurality of product images, wherein the fourth image classifier is trained to identify specific features based on the determined category of the first product image;

wherein the first label prediction is further based on the fourth label prediction of the fourth image classifier.

6. A system, comprising:

a processor and a memory, wherein the processor is configured to:

retrieve a plurality of product images from the memory;

determine a category of a product in each of the plurality of product images based on a product information associated with respective product images;

apply a respective image classifier of a plurality of image classifiers to each of the plurality of product images based on the respective determined category to predict labels for each of the plurality of product images, the applying comprising:

provide a first label from applying a first image classifier to one or more features of a first product image of the plurality of product images, wherein the first product image is from a first product category; and provide a second label from applying a second image classifier to one or more features of a second product image of the plurality of product images, wherein the second product image is from a second product category;

store the labels from the plurality of image classifiers including the first label and the second label in the memory; and select, in response to a captured image from a user computing device, one of the plurality of product images as a recommendation based on the labels including the first label and the second label and output the selected one of the plurality of product images for display on the user computing device, wherein the plurality of image classifiers are configured to predict at least one of a content label or a view label for the product in each of the plurality of product images based on the determined category, wherein the plurality of image classifiers comprises category-specific image classifiers specific to respective ones of the determined categories and generic image classifiers for categories not associated with the category-specific image classifiers, wherein the first image classifier comprises at least one of the category-specific image classifiers and the second image classifier comprises at least one of the generic image classifiers.

7. The system of claim 6, wherein the first product image is in a first category and the second product image is in a second category, and wherein the first category and the second category are different.

8. The system of claim 6, wherein the processor is further configured to:

apply the second image classifier to a third product image of the plurality of product images, wherein the third product image of the plurality of product images is associated with a third category different from the second category; and store a third label of the second image classifier for the third product image of the plurality of product images.

9. The system of claim 6, wherein the first image classifier is a category-specific image classifier associated with the first category.

10. The system of claim 6, wherein applying the first image classifier to the first of the plurality of product images further comprising:

apply a fourth image classifier to the first product image of the plurality of product images, wherein the fourth image classifier is trained to identify specific features based on the determined category of the first product image;

wherein the first label is further based on a fourth label prediction of the fourth image classifier.

11. A system, comprising: a server; and an image classification system, the image classification system comprising: a processor and a memory, wherein the processor is configured to:

retrieve a plurality of product images from the memory;

determine a category of a product in each of the plurality of product images;

predict labels for each of the plurality of product images based on applying a respective image classifier of a plurality of image classifiers to each of the plurality of product images based on the determined category, the applying comprising:

predict a first label for a first product image of the plurality of product images based on applying a first image classifier to features of the first product image, wherein the first image classifier is configured to identify features specific to the determined category of the first product image; and predict a second label for a second product image of the plurality of product images based on applying a second image classifier to features of the second product image, wherein the second product image is from a determined category that does not include specifically trained image classifiers, and wherein the second image classifier is configured to identify features in product images that are from categories that do not include the specifically trained image classifiers;

store the labels including the first label and the second label in the memory; and select, in response to receiving a captured image from a user computing device, one of the plurality of product images based on the predicted labels for each of the plurality of product images and output the selected one of the plurality of product images for display on the user computing device, wherein the plurality of image classifiers are configured to predict at least one of a content label or a view label for the product in each of the plurality of product images based on the determined category, wherein the first image classifier comprises at least one of a plurality of category-specific image classifiers for the determined categories and the second image classifier comprises at least one of a plurality of generic image classifiers for categories not associated with a corresponding one of the category-specific image classifiers.

12. The system of claim 11, wherein the server is configured to receive the captured image from the user computing device over a network.

13. The system of claim 12, wherein the server is configured to compute a visual similarity score between the captured image and the plurality of product images based on the predicted labels of the plurality of image classifiers including the first label of the first image classifier and the second label of the second image classifier.

14. The system of claim 13, wherein the server is configured to select one of the plurality of product images having a highest visual similarity score with the captured image and output the selected one of the plurality of product images for display on the user computing device.

15. The system of claim 11, wherein the first image classifier is a category-specific image classifier.

* * * * *